April 11, 1967 G. J. GARDNER 3,313,410
SIZING AND ORIENTING DEVICE AND METHOD
Filed Oct. 17, 1963 2 Sheets-Sheet 1
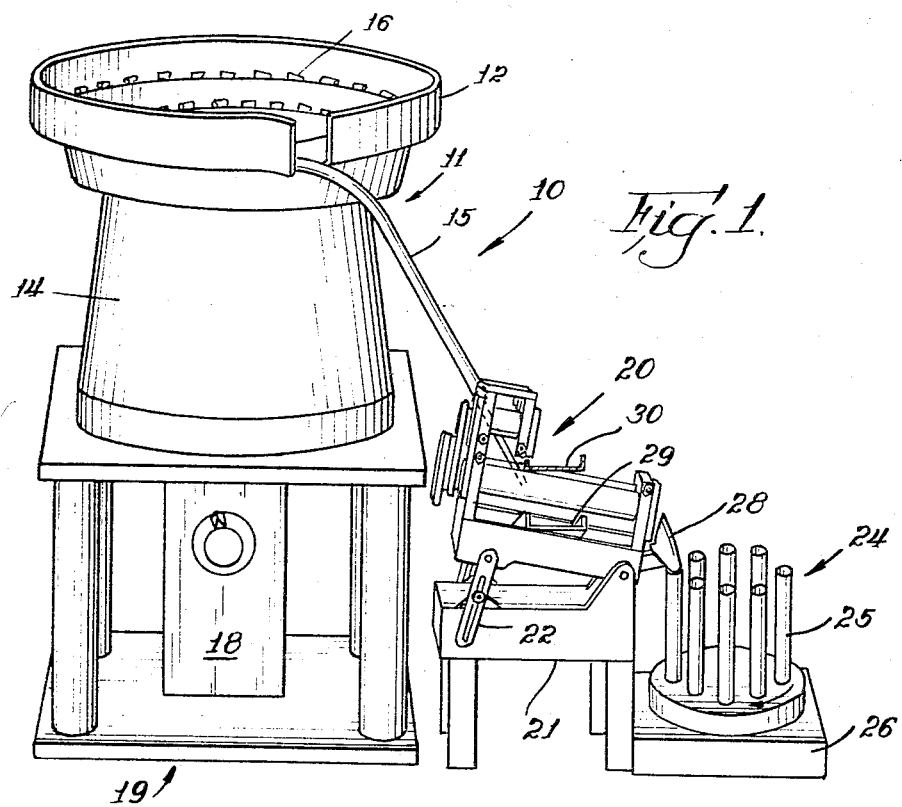
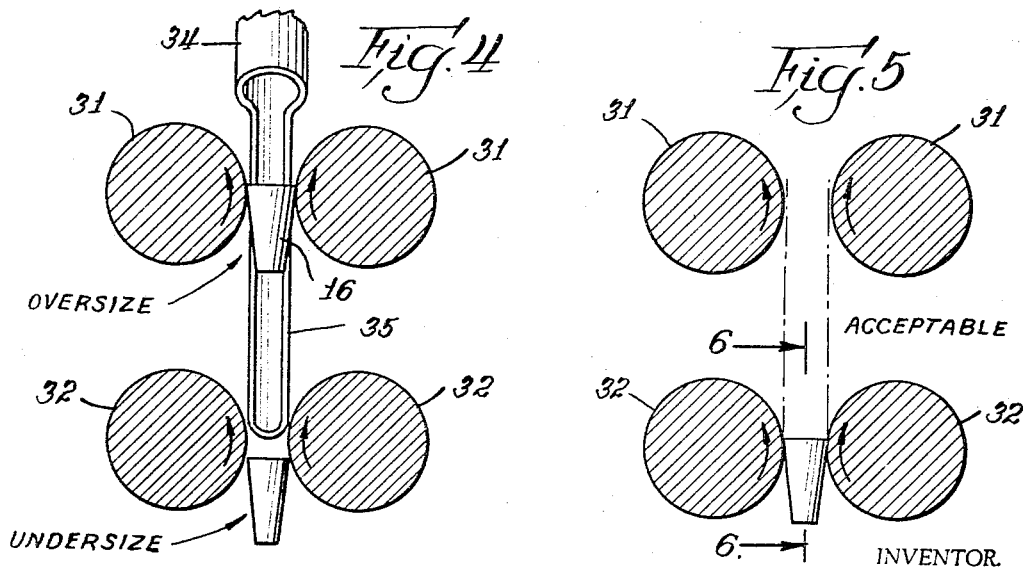
INVENTOR.
George J. Gardner
BY
Dominik, Rudy & Stein
Attys.

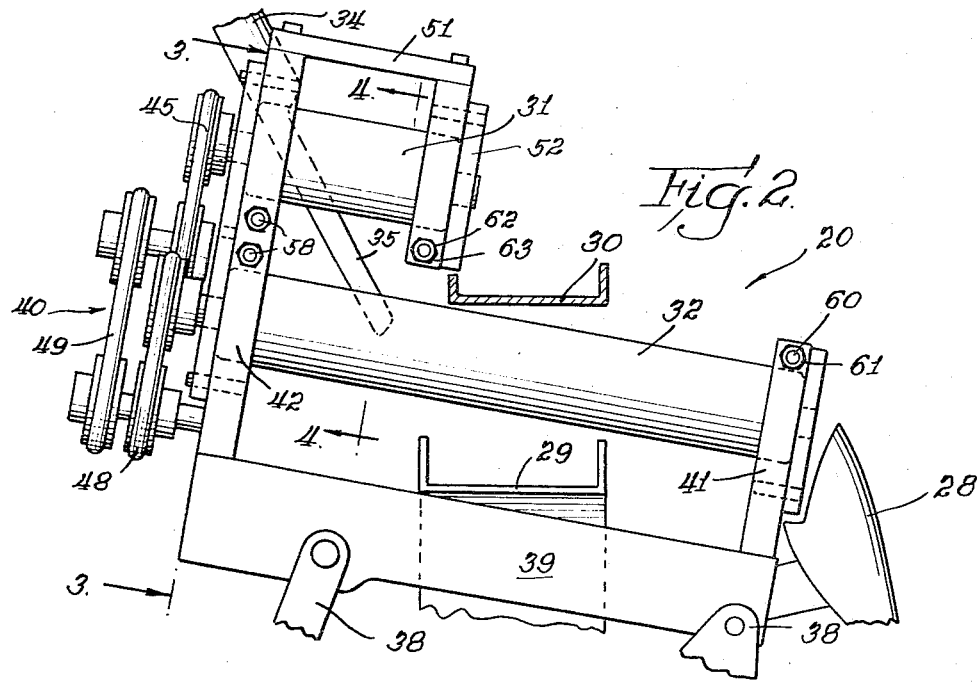
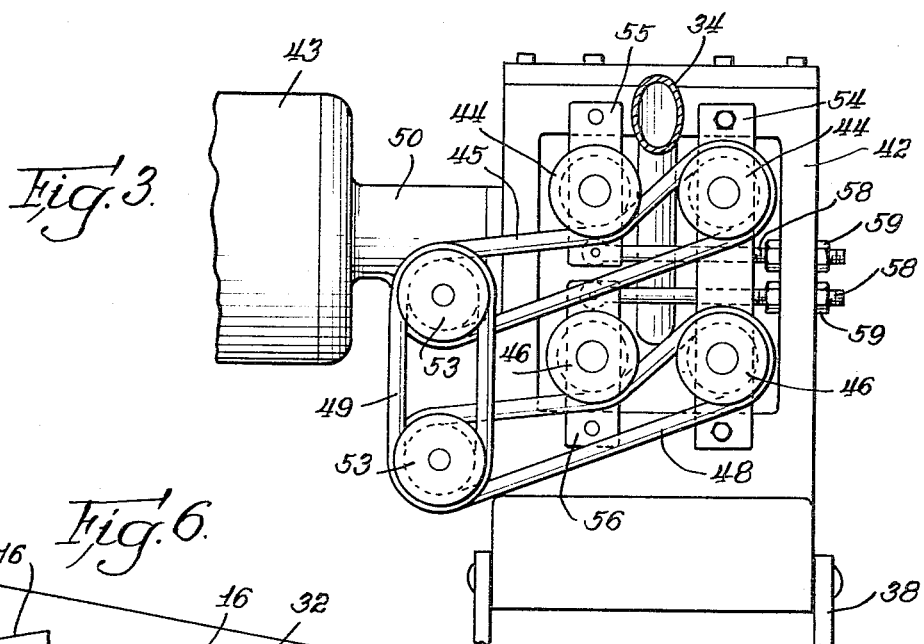
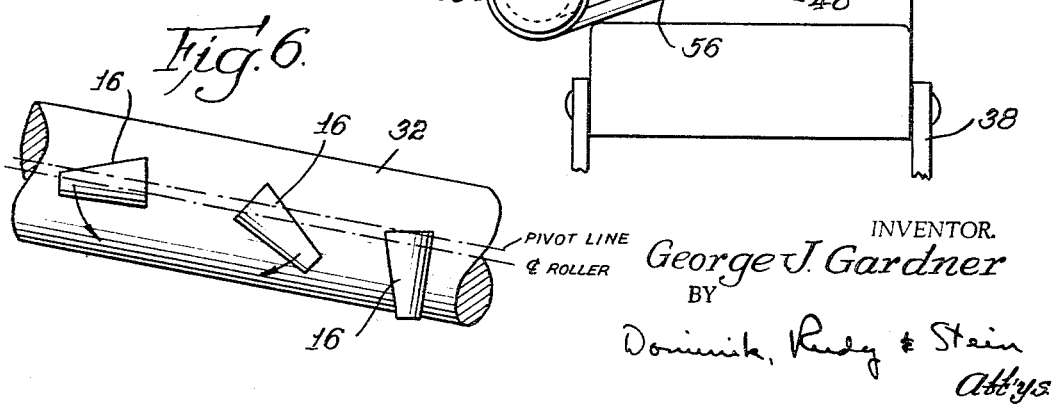

United States Patent Office 3,313,410
Patented Apr. 11, 1967

3,313,410
SIZING AND ORIENTING DEVICE AND METHOD
George J. Gardner, Fairview, Pa., assignor to Automation Devices, Inc., Erie, Pa., a corporation of Pennsylvania
Filed Oct. 17, 1963, Ser. No. 345,819
7 Claims. (Cl. 209—73)

The present invention relates to a sizing and orienting device and method for sizing and orienting parts. More particularly, the invention has to do with the sizing and orienting of frusto-conical parts in which the angularity of the tapered face is small, and accordingly such parts fall into the category of "locking parts."

More particularly, numerous small tapered parts such as the tapered rolls for tapered rollers bearings, machine tool spindle types where locking is required, and a whole host of other similar shapes are ground to an angularity of 2° to 3°, such angle permitting the part when thrust into a collet or spindle of complementary angle to lockingly engage the same. In the event the angle exceeds approximately 16°, the part then becomes a "self-releasing" type part.

Parts of the locking character, when fed from a hopper and tumbled onto parallel rails, will lock between the parallel rails just the same as they lock in their ultimate intended position. Accordingly when such parts are to be fed for purposes of automated assembly, parallel rails cannnot be employed. Various devices in the nature of chutes, elevators, and the like have been employed in the past.

In addition, when such tapered parts are being manufactured, their finishing includes roughed grinding, finish grinding, and oftentimes honing and other finishing steps. It is important that these parts be properly sized between the various steps as an oversize part could cause considerable damage to the grinding machinery in a centerless grinder. Similarly, undersize parts could possibly get lost through various sorting devices in the processing machine, and accordingly it is desirable to progressively sort the tapered parts for size in the course of their finishing.

It is a principal object of the present invention to provide an apparatus which will not only position and orient locking parts of the frusto-conical tapered character, but simultaneously size the same for purposes of further finishing operations. A related object of the invention is to feed, orient, and size in accordance with a method which is readily adaptable to a wide variety of sizes, and may be employed without substantially increased costs over the mere selection of an optimum size.

Still another object of the invention is to provide a sizing and orienting apparatus and method which has a very high volume capacity, and is inherently rugged, sturdy, and durable, thus permitting long periods of operation without breakdown or servicing.

Yet another object of the subject invention is to provide an apparatus for sizing, orienting, and feeding locking type frusto-conical parts which is readily adjustable to varying sizes while in motion thereby insuring accurate operation.

Still another object of the subject invention is to provide an apparatus for sizing, feeding, and orienting frusto-conical tapered parts in which sufficient visible inspection is permitted by the operator in order to determine the random scattering of oversize, properly sized, and undersized parts in the course of the feeding to thereby be able to make the indicated corrections to the preceding operating to maximize the optimum sized portion of the mix.

Further objects and advantages of the present invention will become apparent as the following description of an illustrative embodiment of the apparatus and the method proceeds, taken in conjunction with the accompanying drawings, in which:

FIG. 1 is a front elevation assembly view in perspective showing the operative relationship between the various elements of the sizing and orienting device illustrative of the subject invention.

FIG. 2 is a front elevational view of the sizer illustrated in FIG. 1 as one of the elements of the sizing and orienting device.

FIG. 3 is an end view of the sizer shown in FIG. 2 taken from the left hand portion thereof illustrating the relationship between the belts on the drive.

FIG. 4 is a diagrammatic view taken along section line 4—4 of FIG. 2 illustrating the relationship between the oversized and undersized rollers and a part being oriented and sorted thereby.

FIG. 5 is a view similar to FIG. 4, but illustrating the relationship between an acceptable part and the rollers.

FIG. 6 is a side view enlarged and partially diagrammatic illustrating the orienting relationship between the tapered parts and the feed roll.

Reference to FIG. 1 will illustrate that the sizing and orienting assembly 10 includes as one of its principal elements a vibratory feeder 11. The vibratory feeder 11 includes a vibratory feeder bowl 12 mounted atop the feeder with a parapet-like interior walk on which the various locking parts 16 are vibratorily urged upwardly by the vibratory feeder drive unit 14 into the vibratory feeder discharge drive 15. A vibratory feeder control unit 18 is provided in this instance beneath the vibratory feeder drive unit 14 and adjustably controls the rate of feed of the locking parts 16. The entire vibratory unit is mounted on a vibratory feeder stand 19 which can be interconnected to the other elements of the sizing and orienting device in order to process the method as well as complete the apparatus illustrative of the subject invention.

The sizer element 20, as will be noted, is positioned between the vibratory feeder 11 and the magazine nest 24. The sizer 20 includes a sizer stand 21 with a sizer stand adjustment assembly 22 positioned to adjustably set the angle of the sizer.

The acceptably sized locking parts 16 are dropped into the acceptance chute 28 and moved therefrom into the individual magazines 25 located atop the index stand 26. After several of the magazines 25 are filled, they can be removed and positioned for feeding for either a further step in the grinding or finishing of the locking parts, or to direct the same into assembly equipment of varying character.

The oversized parts are discharged, as will be noted in FIG. 1, into the oversized chute 30 (see also FIG. 2) and the undersized chute 29 receives and delivers those undersized parts to a separate bin. In accordance with the particular manufacturing operation involved, both the oversized and undersized elements may be subsequently treated, or discharged to scrap as the manufacturing process dictates. While chutes 29, 30 have been shown in this instance, it will be appreciated that varying discharge means may be employed to take advantage of the orientation of the locking parts as they are delivered by the various rolls to the oversized and undersized chutes.

The operation of the sizing and orienting device is better understood from the diagrammatic showings in FIGS. 4 and 5 where it will be seen that the feed chute 34 is connected to the lower portion of the vibratory feeder discharge track 15, and deliver the same progressively and sequentially to the upper rolls 31 and the lower rolls 32. The feed chute 34 is provided with a cut-away portion at its lower end, the projected cross-section of which is less than the distance between the upper rolls 31 and the lower rolls 32, and yet is of a sufficient width to continue delivering the locking parts 16 to the rolls. The lower portion of the feed chute 34 comprises the feed chute pick-off 35 as best illustrated in FIG. 4.

As the tapered parts 16 drop from the feed chute 34, (see particularly FIG. 6) they may be in almost any position. In the event the part is upside down and is accepted by the upper rolls 31 as oversized, it will tumble until the frusto-conical taper points downwardly as shown in FIG. 6. In the event the tapered locking part 16 is acceptable, it will drop through the space between the upper rolls 31 and be caught by the lower acceptance rolls 32, and delivered to the end portion of those rolls for discharge into the acceptance chute 28. Those tapered parts 16 which are too small to be tangentially engaged by either the upper rolls 31 or the lower rolls 32 will proceed downwardly along the feed chute pick-off 35, a portion of the feed chute 34, and be discharged directly into the undersized chute 29 as illustrated in FIGS. 1 and 2.

The details of construction of the roller assembly as well as the drive unit are illustrated in FIGS. 2 and 3. There it will be seen that the frame base 39 is pivotally supported on a stand pivot 36, and at its drive end portion, pivotally supported by means of the adjustment pivot 38, which, as illustrated in FIG. 1, would permit the entire unit to pivot so that the angularity of the upper rolls 31 and lower rolls 32 may be adjusted for the particular speed of feed and part involved.

The rolls are driven by means of a belt assembly 40 (see FIG. 3) which are at the opposite end of the discharge end frame 41 and mounted on the feed end frame 42. An electric motor 43 is provided with a gear box 50 which in turn drives the main drive belt 49 by means of the main drive pulleys 53. The main drive pulleys 53 are double pulleys, and each one drives its respective roller gear drive belt. For example, it will be noted that upper roll pulleys 44 are engaged by the upper roll belt 45, while the lower roll pulleys 46 are engaged by the lower roll belt 48. A cantilever bracket 41 is employed to support the upper roll bearing hanger 52, and thereby rotatably and adjustably position the upper rolls 31 in spaced center counterrotating relationship.

The pulleys, both the upper roll pulleys 44 and the lower roll pulleys 46 are supported by means of a pulley hanger 54 which supports both of those on the opposite side of the feed delivery, and the discharge side upper pulley hanger 55 and the discharge side lower pulley hanger 56. The pulley hangers, as illustrated principally in FIG. 3, are adjustably supported in position by means of the pulley hanger support bolts 58 which serve the additional purpose, by means of adjusting the lock nuts 59, of rotating the adjustment pulley hangers 55, 56 about their respective upper and lower axes in order to vary the center distance between the rollers. The opposite ends of the rollers are adjusted by the free end adjustment lower roller bolt and nut 60, 61 and upper roller bolt and nut 62, 63. It will be observed that this adjustment can be made while the products are actually in motion so that varying gravitational and frictional characteristics which cannot be calculated in advance can be compensated while the machine is in operation. Also the angle of the rollers can be adjusted while in operation by the adjustment assembly 22. The arrangement between the pulleys 44, 46 which are on the discharge side upper pulley hanger and discharge side lower pulley hanger 55, 56, is such that the pulleys serve to operate in idle relationship with the respective upper roll belt 45 and lower roll belt 46, and are tangentially in engagement therewith about their respective adjustment pivots.

Thus adjustment of the tapered locking part sorting can be adjusted in all directions during operation. The angle of the rollers can be tilted by the adjustment assembly 22 to accelerate or retard the discharge rate. The parallel distance between the upper rollers 31 may be adjusted independently of the adjustment of the lower parallel roller 32 center distance. Finally, a diverging or converging relationship between the axes of the upper or lower rollers 31, 32, may be imparted by independently adjusting the upper roller bolt and nut 60, 61, or the lower roller bolt and nut 62, 63, to vary the location along the axis of the rollers where the parts will drop off. The complete universal nature of adjustment permits operational compensation for virtually all variables attendant to the sizing and orienting of the tapered locking parts 16.

The method of feeding necessarily presupposes a sequential sizing of tapered locking parts, and a sorting of the same into their varying sizes by means of a vibratory feed unit followed by a sizing device and thereafter by an indexing magazine. The apparatus, as set forth in detail above, includes at least a pair of counter-rotating rollers one stationed above the other, the same being positioned in proximate relation to each other and a discharge chute with a pick-off portion which will permit the sizing of parts into oversize, undersize, and acceptable. In addition, the belting arrangement is such as to provide for adjustment while in operation without disturbing pre-set conditions, and will necessarily reduce down-time and shifting time between one construction of locking part and another.

Although particular embodiments of the invention have been shown and described in full here, there is no intention to thereby limit the invention to the details of such embodiments. On the contrary, the intention is to cover all modifications, alternatives, embodiments, usages and equivalents of the sizing and orienting device and method for sizing and orienting parts as fall within the spirit and scope of the invention, specification and the appended claims.

I claim:

1. Apparatus for feeding and sizing tapered locking parts comprising: a plurality of laterally spaced pairs of counter-rotating rollers positioned vertically one above the other; means for rotating said rollers; conveyor chute means extending between each pair of counter-rotating rollers and adapted to confine and to feed said parts in end-to-end relationship therein past said pairs of counter-rotating rollers; the center distance between said pairs of counter-rotating rollers being established to cause predetermined ones of said pairs of rollers to engage and to remove oversize parts from said conveyor means, to engage and to remove acceptable parts from said conveyor means, and to permit undersize parts to pass between said pairs of rollers.

2. The apparatus of claim 1 further including means for gathering said parts removed by said pairs of rollers as they come off said rollers and for conveying said sized parts to subsequent apparatus.

3. A sizing and orienting device for locking tapered parts comprising, in combination, a chute for end to end feeding of the locking parts, a tubular end on said chute, said end having a pick off portion with an arcuate base of lesser chord than the inner diameter of the tubular end, and counter-rotating rollers stacked atop each other and in flanking relation to the pick off portion, drive means for said rollers.

4. A sizing and orienting device for locking tapered parts comprising, in combination, a vibratory feeder, a chute discharge from said feeder for end to end discharge of the locking parts, a tubular end on said chute, said end having a pick off portion with an arcuate base of lesser chord than the inner diameter of the tubular end, counter-rotating rollers stacked atop each other and in flanking relation to the pick off portion, drive means for said rollers, and adjustable hanger means for the rollers whereby the roller center distances may be operatively adjusted while feeding.

5. A sizing and orienting device for locking tapered parts comprising, in combination, a vibratory feeder, a chute discharge from said feeder for end to end discharge of the locking parts, a tubular end on said chute, said end having a pick off portion with an arcuate base of lesser chord than the inner diameter of the tubular end, counter-rotating rollers stacked atop each other and in flanking relation to the pick off portion, drive means for said rollers, adjustable hanger means for the rollers whereby the roller center distances may be operatively adjusted while feeding, chute means beneath the lowest pair of rollers to selectively divert undersize parts, and discharge means at the ends of the rollers to discharge and selectively sort oversize and acceptable of the locking parts.

6. A sizing and orienting device for locking tapered parts comprising, in combination, a chute feeder for end to end delivery of the locking parts, a tubular end on said chute, said end having a pick off portion with an arcuate base of lesser chord than the inner diameter of the tubular end, counter-rotating rollers stacked atop each other and in flanking relation to the pick off portion, adjustable hanger means for the rollers whereby the roller center distances may be operatively adjusted while feeding, and drive means for said rollers including belt drive means for the adjustable rollers reaved to permit tangential belt engagement.

7. A sizing and orienting device for locking tapered parts comprising, in combination, a vibratory feeder, a chute discharge from said feeder for end to end discharge of the locking parts, a tubular end on said chute, said end having a pick off portion with an arcuate base of lesser chord than the inner diameter of the tubular end, counter-rotating rollers stacked atop each other and in flanking relation to the pick off portion, adjustable hanger means for the rollers whereby the roller center distances may be operatively adjusted while feeding, chute means beneath the lowest pair of rollers to selectively divert undersize parts, and discharge means at the ends of the rollers to discharge and selectively sort oversize and acceptable of the locking parts, and drive means for said rollers including belt drive means for the adjustable rollers reaved to permit tangential belt engagement.

References Cited by the Examiner

UNITED STATES PATENTS

| 754,390 | 3/1904 | Riddlebaugh | 209—107 |
| 2,891,668 | 6/1959 | Hunt | 209—107 |
| 3,189,178 | 6/1965 | Calleson et al. | 209—74 X |

ROBERT B. REEVES, *Primary Examiner.*